United States Patent [19]

Hall, Jr. et al.

[11] Patent Number: 4,677,190

[45] Date of Patent: Jun. 30, 1987

[54] SYNTHESIS AND RING-OPENING POLYMERIZATION OF BICYCLIC LACTONES CONTAINING A TETRAHYDROPYRAN RING

[75] Inventors: Henry K. Hall, Jr., Tuscon, Ariz.; Hiroshi Sumitomo, Omoteyama; Masahiko Okada, Takamoridai, both of Japan

[73] Assignee: University Patents, Inc., Westport, Conn.

[21] Appl. No.: 861,461

[22] Filed: May 9, 1986

[51] Int. Cl.⁴ .......................................... C08G 63/08
[52] U.S. Cl. .................................... 528/354; 549/274
[58] Field of Search ........................ 528/354; 549/274

[56] References Cited

U.S. PATENT DOCUMENTS

| | | | |
|---|---|---|---|
| 4,089,971 | 5/1978 | Thies et al. | 424/278 |
| 4,241,097 | 12/1980 | Sprecker et al. | 426/536 |
| 4,264,456 | 4/1981 | Sprecker et al. | 252/8.9 |
| 4,362,882 | 12/1982 | Schaper et al. | 549/274 |
| 4,387,215 | 6/1983 | Bailey | 528/354 |

*Primary Examiner*—Earl Nielsen
*Attorney, Agent, or Firm*—George M. Yahwak

[57] ABSTRACT

The synthesis of novel strained bicyclic lactones and their ring-opening polymerization to high molecular weight polyester polymers is disclosed.

7 Claims, No Drawings

SYNTHESIS AND RING-OPENING POLYMERIZATION OF BICYCLIC LACTONES CONTAINING A TETRAHYDROPYRAN RING

Ring-opening polymerization of bicyclic compounds containing two or more hetero-atoms provides a useful method to synthesize a new class of specialty polymers possessing heterocyclic structures in their main chains. For example, a variety of stereoregular polysaccharides and their analogues (tetrahydropyran rings are very common in naturally occurring structures such as polysaccharides and antibiotics) have been prepared by cationic ring-opening polymerization of appropriate anhydrosugar derivatives (bicyclic acetals) followed by chemical modifications (See, for example, Hall. H. K. and Y. Yokoyama, *Adv. Polym. Sci.* (1982) 42:105, and Sumitomo, H., and M. Okada, "Ring-Opening Polymerization", Elsevier Applied Science Publishers, London (1984) I: 299).

Furthermore, anionic polymerization of 8-oxa-6-azabicyclo[3.2.1]octan-7-one (bicyclic lactam) gave a polyamide containing tetrahydropyran rings, which was characterized by excellent permeability for water, and permselectivity for alkali metal ions and solutes of various sizes in aqueous solutions. In contrast, cationic polymerization of 6,8 dioxabicyclo[3.2.1]octan-7-one (bicyclic lactone) having the same skeleton as that of the bicyclic lactam above yielded highly selectively 10-, 20-, and 25-membered cyclic oligoesters (macrolides) composed of alternating tetrahydropyran ring and ester moieties. Among these, the 20- and 25-membered macrolides act as ion carriers and can be regarded as model compounds for naturally occurring neutral ionophores. (See Tajima, I., M. Okada, and H. Sumitomo, *J. Am. Chem. Soc.* (1981) 103: 4096).

Bicyclic acetals, lactones, and lactams consisting of a bicyclo[3.2.1]octane skeleton are relatively easily prepared, while the syntheses of bicyclic compounds containing a more strained bicyclo[2.2.2]octane skeleton are generally difficult. The studies dealing with the polymerization of heterobicyclic monomers of this type have, therefore, been limited.

In order to broaden the scope of the synthesis of specialty polymers by ring-opening polymerization of bicyclic monomers, it is desirable to explore convenient synthetic methods for strained bicyclic acetals, lactones, and lactams.

The present invention describes the synthesis of a novel strained bicyclic lactone, 2,6-dioxabicyclo[2.2.2]octane-3-one (Formula I), its ring-opening polymerization to a high molecular weight polyester (Formula II), a second novel strained bicyclic lactone, 2,5-dioxabicyclo[2.2.2]octane-3-one (Formula III), and its ring-opening polymerization to a high molecular weight polyester (Formula IV) containing tetrahydropyran rings in the main chain:

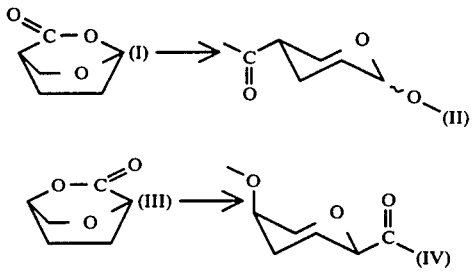

As the polyesters of of Formulae II and IV are hydrolyzed to biomedically inert materials under physiological conditions, these polyesters may be used for biomedical purposes such as in the manufacture of biodegradable slow-release agents and sutures for surgical operations.

The synthesis of 1,6-dioxabicyclo[2.2.2]octan-3-one was achieved through a six step reaction sequence as illustrated below:

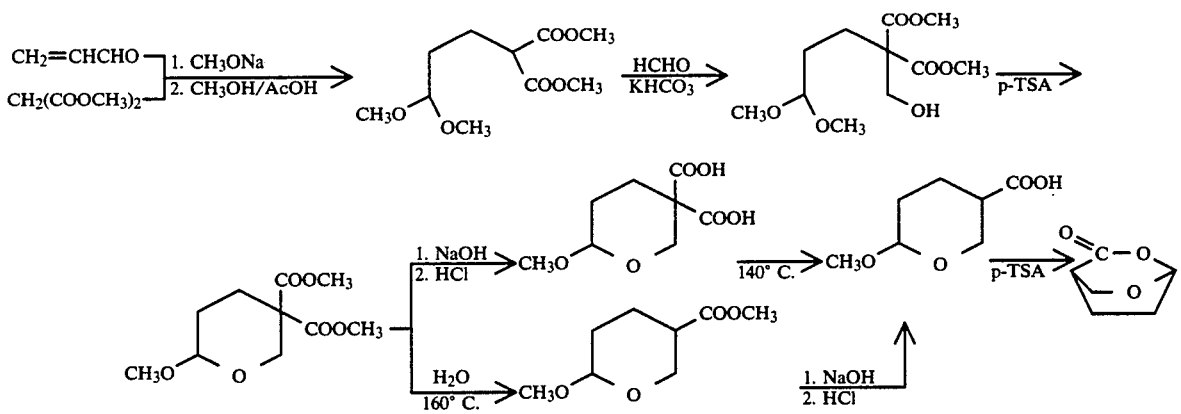

Dimethyl 4,4-dimethoxybutane-1,1-dicarboxylate was prepared by the Michael addition of dimethyl malonate to acrolein followed by acetalization. Subsequent hydroxymethylation with formaldehyde in the presence of potassium hydrogen carbonate gave nearly quantitatively dimethyl 1-hydroxy-5,5-dimethoxypentane-2,2-dicarboxylate. This compound rapidly underwent acid-catalyzed intramolecular cyclization in a dilute solution in benzene, aided by the favored six-membered ring formation, to yield dimethyl 6-methoxytetrahydropyran-3,3-dicarboxylate. The tetrahydropyran derivative was saponified to the free dicarboxylic acid, which was then decarboxylated in diglyme or dimethyl sulfoxide at 120°–140° C. to give 6-methoxytetrahydropyran-3-carboxylic acid as a stereoisomeric mixture in a quantitative yield. The carboxylic acid was then heated in a dilute solution in toluene in the presence of a catalytic amount of p-toluenesulfonic acid to give the desired bicyclic lactone (I). The overall yield based on acrolein was approximately 20%.

An alternative, but less satisfactory, synthetic route involves the decarboxylation of the dimethyl 6-methoxytetrahydropyran-3,3-dicarboxylate in the presence of sodium chloride and water in dimethyl sulfoxide, followed by saponification of the resulting methyl 6-methoxytetrahydropyran-3-carboxylate. The disadvantage of this route is the decarboxylation requires higher temperature (160°–170° C.), longer reaction time (5–8 hours), and some side reactions are unavoidable.

The synthesis of 2,5-dioxabicyclo[2.2.2]octan-3 one was achieved through a three step reaction sequence as illustrated below:

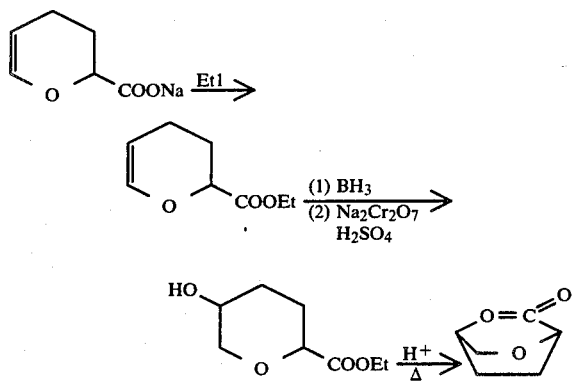

Sodium 3,4-dihydro-2H-Pyran-2-carboxylate was esterified with ethyl iodide in dimethylformamide to afford ethyl 3,4-dihydro-2H-pyran-2-carboxylate. Subsequent hydroboration with a borane solution in tetrahydropyran at 0° C., followed by oxidation with a sodium dichromate-sulfuric acid aqueous solution and subsequent treatment with sodium hydrogen sulfite gave ethyl 5-hydroxytetrahydropyran-2-carboxylate as a stereoisomer mixture. The hydroxytetrahydropyran ester was heated in a dilute solution in the presence of a catalytic amount of p-toluenesulfonic acid, any ethyl alcohol being liberated was removed through a Soxhlet extractor containing type 5A molecular sieves. Column chromatographic separation of the reaction products and subsequent repeated recrystallization gave the bicyclic lactone as colorless crystals; the overall yield was approximately 20%.

The following examples and procedures depicting the formation of the compounds according to the present invention are presented in order to provide a more complete understanding and illustration of the present invention.

EXAMPLE I

PREPARATION OF DIMETHYL 1-HYDROXY-5,5-DIMETHOXYPENTANE-2,2-DICARBOXYLATE

The hydroxymethylation of dimethyl 4,4-dimethoxybutane-1,1-dicarboxylate was carried out. The diester (23.4 g, 0.10 mol) was added dropwise to a mixture of formalin (8.1 ml, 0.10 mol) and potassium hydrogen carbonate (0.8 g, 8 mmol) over 20 min. The mixture was stirred at room temperature for 6 hours until the starting ester was completely consumed. A saturated aqueous solution of ammonium sulfate (35 ml) was added to the reaction mixture. The mixture was then extracted with three 60 ml portions of ethyl ether and the combined extracts were dried over anhydrous magnesium sulfate. The salt was filtered off and rotary evaporation of the solvent from the filtrate gave the product, at 95% yield, as viscous oil.

EXAMPLE II

PREPARATION OF DIMETHYL 6-METHOXYTETRAHYDROPYRAN-3,3-DICARBOXYLATE

A solution of dimethyl-1-hydroxy-5,5-dimethoxypentane-2,2-dicarboxylate made in accordance with Example I (8.4 g, 0.032 mol), p-toluenesulfonic acid (0.052 g, 0.027 mmol) in dry benzene (600 ml) was allowed to reflux through a Soxhlet extractor for 2 hours. The Soxhlet thimble was charged with Type 4 A molecular sieves (ca 20 g). After the mixture was cooled to room temperature, anhydrous potassium carbonate (7 g, 0.05 mol) was added, and the mixture was stirred for 30 min. The mixture was filtered and the solvent was removed by a rotary evaporator. The residual amber oil was distilled under reduced pressure. Yield of the product, which had a bp of 95°–100° C. (1 mmHg), was 84%.

EXAMPLE III

PREPARATION OF 6-METHOXYTETRAHYDRO-PYRAN-3,3-DICARBOXYLIC ACID

Dimethyl 6-methoxytetrahydropyran-3,3-dicarboxylate (6.6 g, 0.028 mol) was added to a solution of sodium hydroxide (2.8 g, 0.07 mol) in water (10 ml), and the mixture was heated at 90° C. for 3 hours. After the reaction mixture was cooled to 0° C., 6N hydrochloric acid (12 ml, 0.07 mol) was added to neutralize the solution. After salting out, the mixture was extracted with five 30 ml portions of ethyl ether. The combined ether extracts were dried over anhydrous magnesium sulfate, filtered, and subjected to rotary evaporation. The residual white powder was recystallized from a mixture of diethyl ether and acetone (3:1). Yield of the product, which decomposed at 136° to 140° C., was 94%.

EXAMPLE IV

PREPARATION OF 6-METHOXYTETRAHYDROPYRAN-3-3-CARBOXYLIC ACID

A 25.2 g (0.13 mol) solution of 6-methoxytetrahydropyran-3,3-dicarboxylic acid made in accordance with Example III and diglyme (250 ml) was heated at 140° C. for 1.75 hours. Removal of the solvent by a rotary evaporator gave the desired product, in a cis and trans stereoisomeric mixture, as a very viscous oil in a quantitative yield.

EXAMPLE V

PREPARATION OF 2,6-DIOXYABICYCLO[2.2.2]OCTAN-3-ONE

A solution of the product obtained in Example IV (2.7 g, 0.017 mol) and p-toluenesulfonic acid monohydrate (0.023) g, 0.12 mmol) in dry toluene (200 ml) was allowed to reflux through a Soxhlet extractor for 2 hours. The Soxhlet thimble was charged with Type 4 A molecular sieves (16 g). After the solution was cooled to room temperature, anhydrous potassium carbonate (5 g, 0.036 mol) was added to the solution, and the mixture was stirred at room temperature for 30 min. The mixture was filtered and subjected to rotary evaporation to afford a slightly yellow wax at a 68% yield. Recrystallization from ethyl ether gave white crystals having a melting point of 69° C.

EXAMPLE VI
PREPARATION OF METHYL 6-METHOXYTETRAHYDRO PRYAN-3-3-CARBOXYLATE

As an alternative to that given in Examples I to V, a mixture of the product obtained in Example II (4.50 g, 0.019 mol), sodium chloride (1.29 g, 0.022 mol), water (0.68 g, 0.038 mol), and dimethyl sulfoxide (20 ml) was heated in a 50 ml round bottomed flask fitted with a condenser. The top of the condenser was connected to a trap containing an aqueous solution of barium hydroxide to monitor the evolution of carbon dioxide. The reaction mixture was heated at 160° C. for 6 hours until the evolution of carbon dioxide almost ceased. The mixture was cooled to room temperature and poured into water (150 ml). After salting out, the aqueous solution was extracted with four 60 ml portions of ethyl ether. The combined ether extracts were washed with a saturated aqueous solution of sodium chloride, dried over anhydrous magnesium sulfate and filtered. Rotary evaporation of the solvent gave an amber oil. It was distilled under reduced pressure to afford the product as a transparent liquid. Subsequent treatment with NaOH and HCl yields the product of Example IV.

The bicyclo lactone of Example V consists of a strained bicyclo[2.2.2]octane skeleton and shows an enhanced polymerization reactivity as would be expected. Polymerization was examined under a variety of conditions. Since this monomer was highly hygroscopic, a high vacuum technique was employed for the polymerization. The results obtained from the polymerization of this compound are presented in Table I. Both cationic and anionic initiators were effective for the polymerization; the compound was readily polymerized with boron trifluoride etherate at or blow $-60°$ C. to give high molecular weight polymers ($M_n$ $1\times10^5$) in high yields. At higher temperatues or with stronger initiators, such a phosphorus pentafluoride, the compound afforded relatively low molecular weight polymers, presumably due to some chain breaking reactions. The lactone was also polymerized with anionic initiators, although higher temperature and longer reaction time were required.

TABLE I
POLYMERIZATION OF 2,6-DIOXABICYCLO[2.2.2]OCTAN-3-ONE

| Solvent[a] | Initiator | Temp. °C. | Time min | Yield[b] % | Mp[c] °C. |
|---|---|---|---|---|---|
| DCM | BF₃OEt₂ | 0 | 15 | 50 | — |
| DCM | BF₃OEt₂ | −60 | 15 | 95 | 150–157 |
| DCM | BF₃OEt₂ | −90 | 10 | 12 | 141–154 |
| DCM | BF₃OEt₂ | −90 | 30 | 95 | 138–148 |
| DCM | BF₃OEt₂ | −90 | 24[d] | 93 | 144–156 |
| DCM | PF₅ | −60 | 15 | 87 | 146–155 |
| THF | Li—BzPh[e] | 0 | 67[d] | 37 | 153–159 |

[a]DCM, dichloromethane; THF, Tetrahydrofuran.
[b]Methanol-insoluble polymer
[c]With gradual decomposition; determined by differential scanning calorimetry.
[d]Hour
[e]Benzophenone lithium ketyl.

The polymers obtained were white solids, soluble in chloroform, dichloromethane, and γ-butyrolactone and pyridine, and swelled in tetrahydrofuran and 1,4 dioxane. These polymers melted at ca. 150° C. with gradual decomposition (DSC). A transparent flexible film could be cast from a chloroform solution of the polymer with ease, and strips could be drawn on a heated bar to orientation.

The actual polymerization of the strained bicyclic lactone was carried out substantially as indicated in the following example:

EXAMPLE VII
POLYMERIZATION OF 2,6-DIOABICYCLO[2.2.2]OCTAN-3-ONE

Cationic polymerization of the compound produced by Example V was carried out in dichloromethane at temperatures between −90° and 0° C. with boron trifluoride etherate and phosphorus pentafluoride an initiators. A high vacuum technique was employed for the polymerization. After the polymerization was terminated by the addition of a small amount of pyridine, the reaction mixture was poured into a large volume of methanol to precipitate a polymer. It was purified by repeated reprecipitation from dichloromethane and methanol as a solvent-precipitant pair, and dried under reduced pressure to a constant weight.

Anionic polymerization was also done. This was carried out in tetrahydrofuran at 0° C. by using benzophenone monothithium complex as an initiator. After a specified time, a sufficient amount of acetic anhydride was added to the solution and the resulting mixture was stirred at room temperature for several hours. The separation and purification of the polymer were similar to those described for the cationic polymerization. IR (film) 1738 ($\nu$C=O), 1125 ($\nu$C-O-C) cm$^{-1}$; $^1$H NMR (CDCl₃) δ6.12 (H-2$_{eq}$), 5.95 (H-2$_{ax}$), 3.8 4.2 (2H-6), 2.5–2.8 (H-5), 1.6 2.2 (2H-3, 2H-4); Anal. Calcd. for (C₆H₈O₃)$_n$; C 56, H 6.29. Found; C 56.28 H 6.11.

There are three possible modes of bond cleavage when the bicyclic lactone of Formula I is polymerized. There are graphically shown as follows:

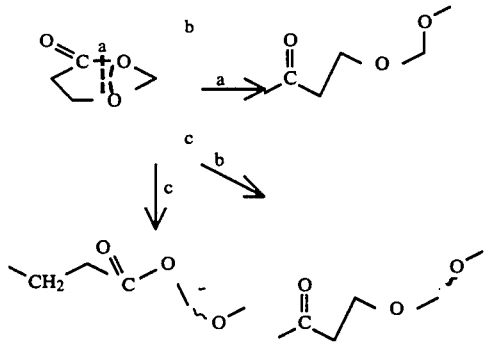

The first is the acyl-oxygen scisson (a) of the ether linkage, leading to a cis-disubstituted tetrahydropyran ring; the second is the alkyl-oxygen scission (b) of the ester linkage which gives a trans-disubstituted tetrahydropyran ring ($S_N2$ type reaction) or a mixture of cis and trans-disubstituted tetrahydropyran rings ($S_N1$ type reaction); and the third is the C(1)-O(6) bond scission (c) giving rise to trans-or a mixture of trans- and cis-disubstituted-lactone rings depending on the types of reactions. Among these, the last mode of bond cleavage is least likely to take place, because the C(1)-O(6) bond (1.390 A) is much shorter than the ordinary C-O bond and hence less reactive.

Each of the cis- and trans-disubstituted tetrahydropyran units in the polymer chain is presumably in conformational equilibrium with its flipped structure. In order to estimate the conformational situation, the conformational free energy difference ΔG between each pair of the conformers was calculated for model compounds, cis and trans-methyl 6-acetoxytetrahydropyran-3-carboxylate. The numerical parameters of substituents in tetrahydropyrans used for the calculation are (in kJ/mol): 3-CO2Me, 2.47; 6-OAc, -2.5.

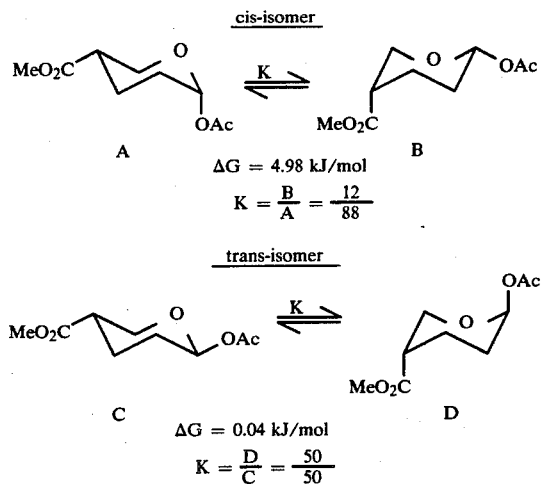

The calculation predicts that the cis-disubstituted tetrahydropyran unit in the polymer predominantly takes the conformation corresponding to Formula A, whereas the trans-disubstituted tetrahydropyran unit exists as equilibrium mixtures of the two conformers corresponding to Formulae C and D.

The proportions of the cis- and trans-disubstituted tetrahydropyran units in the polymer determined by the relative peak areas of the acetal proton signals are listed in the last column of Table I. The cis/trans ratios varied from 11/89 to 76/24 depending on the reaction conditions such as temperature, conversions, and initiators. The polymer having the lowest cis/trans ratio of 11/89 was obtained when the polymerization at −90° C. was terminated at low conversion. Even at −90° C., the cis trans ratios increased to 30/70 with increasing conversion and reaction time. The cis/trans ratios tend to increase with the rise in polymerization temperature.

When phosphorus pentafluoride was employed as an initiator at −60° C., the cis/trans ratio of the polymer dramatically increased to as high as 75/25, in comparison with the cis/trans ratio of 30/70 of the polymer prepared with boron trifluoride etherate at the same temperature. According to the calculation described above, the free energy difference between the energetically favorable, respective conformers of the cis and trans isomers of methyl 6-acetoxytetrahydropyran-3-carboxylate is estimated to be 2.5 KJ/mol. This value, in combination with an entropy of mixing factor Rln2 favoring the trans isomer because of two equipopulated conformations, gives a cis/trans ratio of 67/33 at −60° C. Taking uncertainty in the estimation of the free energy into account, the observed cis/trans ratio of 75/25 implies that even at −60° C., a polymer composed of a nearly thermodynamically controlled equilibrium mixture of the cis- and trans-disubstituted tetrahydropyran units was produced in the presence of a strong initiator.

Although there still remains some uncertainty as to the cationic polymerization mechanism, the propagation proceeds primarily through the $S_N2$-type alkyloxygen scission of the ester linkage of the growing oxonium ion at low temperatures to yield polyester consisting of the trans-2,5-linked tetrahydropyran rings. However, transacetalization which converts the trans unit produced in this way to the more stable cis counterpart inevitably occurs, thus making the structure of the polymer less regular in the polymerization after a relatively longer reaction time or at higher temperature. It seems less likely, but cannot be excluded, that concurrent $S_N1$ type propagation by the oxacarbenium ion giving both the cis and trans units becomes increasingly important with the rise in polymerization temperature to reduce the structural regularity of the polymer.

Anionic polymerization initiated with benzophenone lithium ketyl gave a polymer having the cis/trans ratio of 42/58. The anionic polymerization conceivable involves an alkoxide growing ion, in other words, it proceeds through the acyl-oxygen scission of the ester linkage of the monomer. The formation of both cis and trans units can be interpreted in terms of anomerization at the growing chain end as outlined below. The cis alkoxide (formula E) producing a cis unit in a polymer chain can be converted through ring-chain equilibrium to the trans-alkoxide anion (formula F) which yields a trans unit by the addition of monomer.

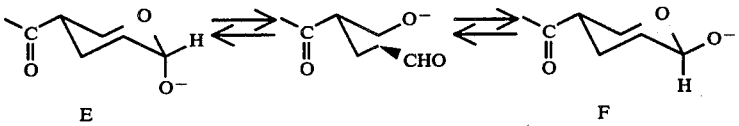

An alternative explanation for the formation of both cis and trans units is epimerization caused by the hydrogen abstraction of the methine proton adjacent to the carbonyl group by alkoxide anions. However, such polymerization seems to be negligible, on the analogy of the finding that a polyester entirely consisting of cis-2,5-linked tetrahydropyran rings was formed in the anionic polymerization of 2,5-dioxabicyclo[2.2.2]octan-3-one under similar conditions or even at higher temperatures.

The bicyclic lactone of formula I can be regarded as a bicyclic acetal-ester, and in fact it was very readily polymerized with cationic initiators as demonstrated previously in this description. Particularly, boron trifluoride etherate was effective for the formation of high molecular weight polyester. The cationic polymerization of the formula I lactone proceeds through the C(1)—O(2) bond cleavage (alkyloxygen scission) of its oxonium ion unequivocally aided by the stabilization of an incipient positive charge on the C(1) atom by the adjacent O(6) atom. However, the resulting polymer was composed of not only trans-disubstituted tetrahydropyran units but also the cis counterparts, their proportions being variable depending on the reaction conditions. The structural irregularity of the polymer conceivable arises from both transacetalization during polymerization and concurrent propagation by a oxacarbenium ion in addition to propagation by an oxonium ion.

The bicyclic lactone 2,5-Dioxabicyclo[2.2.2]octan-3-one according to formula III does not contain any acetal linkage, and consequently its cationic polymerizability is reduced significantly compared with the formula I compound; polymerization of the 2,5-lactone would be more readily initiated with anionic initiators to give its appropriate polyester (formula IV) through the acyl-oxygen scission of the ester linkage. Since transesterification, even if it occurs, does not affect the structure of the polymer, the structurally regular polyester consists entirely of cis-2,5-linked tetrahydropyran units following anionic polymerization.

EXAMPLE VIII
PREPARATION OF ETHYL 3,4-DIHYDRO-2H-PYRAN-2-CARBOXYLATE

A mixture of sodium 3,4-dihydro-2H-pyran-2-carboxylate (150.0 g, 10 mol), ethyl iodide (192.3 g, 1.2 mol), sodium carbonate (10 g), and dimethylformamide (500 ml) was heated at 105°–110° C. for 5 hours. The reaction mixture was cooled to room temperature and water (450 ml) was added to dissolve inorganic sales. The mixture was extracted with four 200 ml portions of benzene. The combined organic layers were washed with four 200 ml portions of water and dried over anhydrous magnesium sulfate. The solution was filtered and the solvent was removed by rotary evaporation. The oily residue was distilled under reduced pressure giving a yield of 87% of product having a bp of 75°–80° C.

EXAMPLE IX
PREPARATION OF ETHYL 5-HYDROXYTETRAHYDROPYRAN-2-CARBOXYLATE

Ethyl 3,4-dihydro-2H-pyran-2-carboxylate (40.0 g, 0.26 mol) and dry tetrahydropyran (350 ml) were charged in a 1 L three-necked flask equipped with a dropping funnel. The solution was cooled with a dry ice-acetone bath to −5° C., and a freshly prepared borane solution in tetrahydrofuran (100 ml, 0.12 mol) was added through the dropping funnel over a period of 2 hours. The solution was stirred at 0° C. overnight.

(Oxidation with sodium dichromate-sulfuric acid)

Water was carefully added to the solution to destroy the excess borane. The reaction mixture was cooled in a dry ice-acetone bath and an oxidizing reagent prepared by dissolving sodium dichromate dihydrate (56.8 g, 0.20 mol) in a mixture of concentrated sulfuric acid (42 ml) and water (230 ml) was added slowly, keeping the solution temperature at 3°–7° C. After the addition of the oxidizing reagent, the solution was stirred at 3°–7° C. for 1 hour. Sodium bisulfite (83.0 g) was added in portions until the brown color of the upper layer almost disappeared. The upper layer was separated and the green viscous lower layer was extracted with four 50 ml portions of ethyl ether. The combined organic layers were washed with four 50 ml portions of a saturated aqueous solution of sodium chloride and dried over anhydrous magnesium sulfate. The drying agent was filtered and the solvent was removed by a rotary evaporator to give viscous oil. Yield, 32.4 g (72%).

(Oxidation with alkaline hydrogen peroxide)

The reaction mixture was cooled to −10° C. and a solution of sodium acetate trihydrate (30.4 g, 0.23 mol) in water (45 ml) was cautiously added. Foams were violently evolved for the first several drops. After the addition was completed, 30% aqueous hydrogen peroxide (30 ml, 0.26 mol) was slowly added to the reaction mixture keeping the temperature at 30±5° C. The reaction mixture was then stirred at room temperature for 1.5 hours. The reaction mixture was salted out, and the resulting organic layer was separated from the aqueous layer. The aqueous layer was extracted with three 70 ml portions of tetrahydrofuran. The combined organic layers were dried over anhydrous magnesium sulfate. After filtration, rotary evaporation of the solvent from the filtrate gave a viscous light yellow oil containing a small amount of white powder. Anhydrous ether (100 ml) was added to dissolve the oil, and the white powder was removed by filtration. Evaporation of the solvent and subsequent distillation under reduced pressure gave a slightly yellow viscous oil. The material had a bp of 98°–107° C. (0.4 mmHg).

EXAMPLE X
PREPARATION OF 2,5-DIOXABICYCLO[2.2.2]OCTAN-3-ONE

A mixture of the cis and trans isomers of ethyl 5-hydroxytetrahydropyran-2-carboxylate (3.9 g, 0.023 mol) was dissolved in dry toluene (200 ml). p-Toluenesulfonic acid monohydrate (0.20 g, 1.1 mmol) was added as a catalyst. The mixture was refluxed for 7 hours through a Soxhlet extractor containing molecular Type A sieves in a thimble. The mixture was cooled to room temperature, and anhydrous sodium carbonate (5 g) was added to neutralize the acid. The solution was passed through a short pad of silica gel and concentrated. A brown viscous oil was subjected to column chromatography (column, silica gel; eluent, n-hexane/ethyl acetate, 1:1 v/v). The crude product thus isolated was purified by repeated recrystallization from a mixture of ethyl ether and n-hexane (5–20:1 v/v). The lactone has a melting point of 56°–57° C.

The polymerization of 2,5-Dioxabicyclo[2.2.2]octan-3-one was carried out under a wide variety of reaction conditions. The results obtained from the polymerization of this compound are presented in Table II.

TABLE II

Polymerization of 2,5-Dioxabicyclo[2.2.2]octan-3-one

| Monomer, g | Solvent,[a] ml | Initiator,[b] | mol % | Temp., °C. | Time, hr | Yield,[c] % |
|---|---|---|---|---|---|---|
| 0.64 | DCM 2.0 | CF$_3$SO$_3$H | 5 | 0 | 46 | 44 |
| 1.0 | DCM 1.0 | SbCl$_5$ | 5 | −60 | 20 | 0 |
| 0.31 | DCM 1.0 | PF$_5$ | 4 | −60 | 70 | 0 |
| 0.50 | DCM 0.5 | BF$_3$OEt$_2$ | 5 | −78 | 24 | 0 |
| 0.64 | THF 2.0 | Li—BzPh | 0.8 | 40 | 6 | 41 |
| 0.64 | THF 2.0 | Li—BzPh | 0.8 | 20 | 30 | 47 |
| 0.64 | THF 3.0 | Li—BzPh | 0.8 | 0 | 6 | 15 |
| 0.64 | THF 3.0 | Li—BzPh | 0.8 | 0 | 100 | 29 |
| 1.94 | THF 8.0 | Li—BzPh | 1.6 | 0 | 40 | 51 |
| 0.64 | TOL 2.0 | n-BuLi | 5 | 0 | 20 | 30 |
| 0.77 | TOL 3.0 | Ti(OiPr)$_4$ | 1.0 | 80 | 24 | 7 |
| 0.77 | bulk — | Ti(OiPr)$_4$ | 1.0 | 60 | 5 | 46 |
| 0.77 | bulk — | Ti(OiPr)$_4$ | 0.2 | 60 | 30 | 8 |

[a]DCM, dichloromethane; TOL, toluene; THF, tetrahydrofuran.
[b]Li—BzPh, benzophenene monolithium complex.
[c]Methanol-insoluble polymer.

Lewis acids such as antimony pentachloride, phosphorus pentafluoride, and boron trifluoride etherate were totally ineffective in initiating the polymerization of the compound of formula III; trifluoromethanesulfonic acid induced polymerization, but the yield and molecular weight of the polymer were low. This is in marked contrast to the polymerization of the 2,6 lactone which undergoes cationic polymerization very rapidly to afford high molecular weight polyester.

The bicyclic 2,5-lactone was polymerized with anionic and coordination initiators such as butyl lithium, benzophenone monolithium complex, and tetraisopropyl titanate. However, the yields and number average molecular weights of the polymers were considerably low. The unexpectedly low yields and low molecular weights of the polymers arise, at least partly, from the precipitation of the polymer out of the tetrahydrofuran or toluene solution during polymerization, in other words, the occlusion of the growing species. In fact, the polymer was insoluble in common organic solvents except dichloromethane and chloroform at room temperature.

A notable feature of the polymer thus obtained is its high melting point. A fractionated polymer having a number average molecular weight of $1.4 \times 10^4$ melted at 281°–297° C. (DSC), approximately 140° C. higher than the high molecular weight polyester derived from the isomeric bicyclic 2,6-lactone. Such a high melting point strongly suggests a higher structural regularity of the polymer. As will be described below, this polymer is entirely composed of the cis-disubstituted tetrahydropyran units and structurally homogeneous, whereas the high molecular weight polyester derived from the isomeric bicyclic 2,6-lactone contains both the trans- and cis-disubstituted tetrahydropyran units, is structurally less regular, comprises thermally unstable ester-acetal structures, and melts with decomposition. On the other hand, the polymer derived from the bicyclic 2,5-lactone does not decompose at least up to 300° C. In connection with the high melting point, this polymer showed crystalline peaks in its X-ray diffraction pattern even in a powdery state.

The cis-disubstituted tetrahydropyran unit in the polymer chain may take two conformations: One has the 2-equatorial and 5-axial substituents, and the other has the 2-axial and 5-equatorial substituents. These two conformers are probably in rapid equilibrium with each other. In order to estimate the proportion of these two conformers, the conformational free energy difference G between the two conformers of the cis isomer of a model compound, methyl 5-acetoxytetrahydropyran-2-carboxylate was calculated. The conformational free energy parameters of substituents in tetrahydropyrans employed for the calculation were (in KJ/mol): 2-$CO_2Me$, 5.78; 5-OAc, 0.71. The $\Delta G$ value was calculated to be 5.07 KJ/mol, corresponding to the equilibrium proportion of 2e/5a-conformer: 2a/5e-conformer = 89:11. This means that the repeating unit of polyester of formula IV predominantly takes the conformation having the carbonyl carbon atom in the equatorial position and the ester oxygen atom in the axial position of the tetrahydropyran ring.

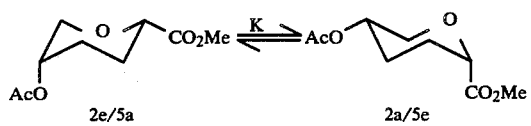

$\Delta G = 5.07$ KJ/mol $K = \dfrac{2a/5e}{2e/5a} = \dfrac{11}{89}$

The formation of the polyester exclusively composed of the cis-disubstituted tetrahydropyran unit definitely proves that the acyl-oxygen scission of the ester linkage occurs when the 2,5-lactone is polymerized with the anionic initiators. This is another way of saying the propagating species is an alkoxide anion and that side reactions altering the configurations of the asymmetric carbons in the repeating units, such as proton abstraction from the methine group adjacent to the carbonyl group, are negligible under the reaction conditions employed.

As inferred from the date in Table II, the reactivity of 2,5-dioxabicyclo[2.2.2]octan-3-one in its anionic and coordination polymerization is unexpectedly low. One of the reasons is, earlier, because of the poor solubility of the polymer, the growing species are occluded in the precipitated polymer as the polymerization proceeds. In addition, the low reactivity is attributable, at least in part, to the steric hindrance encountered when an alkoxide growing anion approaches to a monomer molecule, and also to synperiplanar interactions of the polar carbon-oxygen bonds with the electron pairs on the adjacent oxygen atom in the adduct of the growing anion onto the carbonyl carbon atom of the monomer. According to the quantum chemical calculation by Burgi, a nucleophile approaches to a carbonyl carbon atom along the path for which the angle $\alpha$ between the line joining the nucleophile with the carbonyl carbon and the direction of the C=O bond is in general 100°–110°. If this is the case in the anionic polymerization of 2,5-dioxabicyclo[2.2.2]octan-3-one, a considerable steric hindrance must be overcome, from whichever sides of the plane containing the ester linkage an alkoxide anion attacks the carbonyl carbon atom:

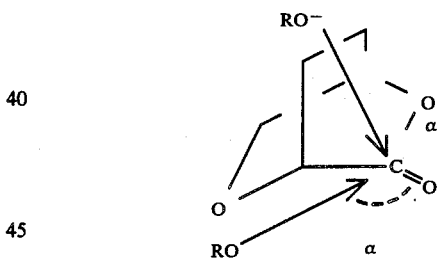

Furthermore, the addition of the alkoxide anion to the carbonyl carbon converts the $sp^2$ carbon to the $sp^3$ carbon, thus giving rise to synperiplanar interactions of the polar C—O⁻ and C—OR bonds with the electron pairs of the adjacent O(2) atom. In addition, a synperiplanar interaction arises also between one of polar C—O bonds and the electron pair of the O(5) atom. This is also responsible for making the formation of the adduct energetically unfavorable. The relatively low reactivity of 2,6-dioxabicyclo[2.2.2]octan-3-one in its anionic polymerization also can be reasonably accounted for by taking these factors into consideration.

In regard to the 2,5-dioxabicyclo[2.2.2]octan-3-one polymerization, propagation by a carboxylate growing anion can be excluded, because the polyester obtained was entirely composed of the cis-2,5-linked tetrahydropyran rings. Therefore, it seems likely that the strain energy of this bicyclic lactone is not so large as to allow the formation of a carboxylate anion by the attack of a growing anion on the bridgehead C(1) atom of the monomer.

The poor cationic polymerizability of 2,5-dioxabicyclo[2.2.2]octan-3-one may be interpreted as follows. Addition of cationic species is most likely to take place on the carbonyl oxygen atom having the highest electron density in the monomer. In this case, ring-opening reaction occurs only through the alkyl-oxygen scission of the ester linkage. However, such bond cleavage seems to take place very reluctantly, because of the relatively small strain energy of the bicyclic structure. In fact, the polyester obtained with trifluoromethanesulfonic acid exclusively consisted of the cis-2,5-linked tetrahydropyran rings, employing that the polymerization proceeded through the acyl-oxygen scission, not through the alkyl-oxygen scission, of the lactone ring. This is in sharp contrast to the behavior of 2,6 isomer in which the alkyl-oxygen scission is facilitated by the presence of the adjacent endocyclic oxygen atom. If cationic species add onto the ester oxygen atom o(2) of the 2,5 isomer, the resulting oxonium ion would be cleaved at the acyl-oxygen bond by the nucleophilic addition of the monomer on the electropositive carbonyl carbon atom. Such nucleophilic addition of the bulky monomer, however, should be hindered for the aforementioned reasons, thus lowering the cationic polymerizability of the 2,5 isomer.

The actual polymerization of 2,5-dioxabicyclo[2.2.2]octane-3-one is as generally described in the following example:

EXAMPLE XI

Antimony pentachloride, boron trifluoride etherate, trifluoromethanesulfonic acid and tetraisopropyl titanate were distilled just before use. Phosphorus pentafluoride was generated by heating p-chlorobenzenediazonium hexafluorophosphate. Benzophenone monolithium complex was prepared from benzophenone and lithium metal in tetrahydrofuran. n-Butyl lithium was used as supplied. Polymerization was carried out, in most cases, in a high vacuum system. After a specified time, pyridine (for cationic polymerization) or acetic acid (for anionic polymerization) was added to terminate the polymerization. The mixture was then poured into a large volume of methanol to precipitate a polymer. It was purified by repeated reprecipitation from dichloromethane solution with methanol.

Thus while we have illustrated and described the preferred embodiment of our invention, it is to be understood that this invention is capable of variation and modification and we therefore do not wish to be limited to the precise terms set forth, but desire to avail ourselves of such changes and alterations which may be made for adapting the invention to various usages and conditions. Accordingly, such changes and alterations are properly intended to be within the full range of equivalents, and therefore within the purview, of the following claims.

Having thus described our invention and the manner and process of making and using it in such full, clear, concise, and exact terms so as to enable any person skilled in the art to which it pertains, or with which it is most early connected, to make and use the same;

We claim:

1. A compound selected from the group consisting of 2,5-Dioxabicyclo[2.2.2]octan-3-one and 2,6-Dioxabicyclo[2.2.2]octan-3-one.

2. The compound of claim 1 which is 2,5-Dioxabicyclo[2.2.2]octan-3-one.

3. The compound of claim 1 which is 2,6-Dioxabicyclo[2.2.2]octan-3-one.

4. A polymeric material obtained by polymerizing a monomer from the group consisting of 2,5-Dioxabicyclo[2.2.2]octan-3-one and 2,6-Dioxabicyclo[2.2.2]octan-3-one.

5. The material of claim 4 wherein the monomer is 2,5-Dioxabicyclo[2.2.2]octan-3-one.

6. The material of claim 4 wherein the monomer is 2,6-Dioxabicyclo[2.2.2]octan-3-one.

7. A method for obtaining a polymeric material which comprises polymerizing by anionic or cationic means a monomer from the group 2,5-Dioxabicyclo[2.2.2]octan-3-one and 2,6-Dioxabicyclo[2.2.2]octan-3-one.

* * * * *